Feb. 2, 1943.  A. A. SAUL  2,309,671
MATERIAL HANDLING APPARATUS
Filed Aug. 23, 1940   4 Sheets-Sheet 1

INVENTOR
August A. Saul
by his attorneys
Stebbins and Blenko

Feb. 2, 1943.  A. A. SAUL  2,309,671
MATERIAL HANDLING APPARATUS
Filed Aug. 23, 1940  4 Sheets-Sheet 3
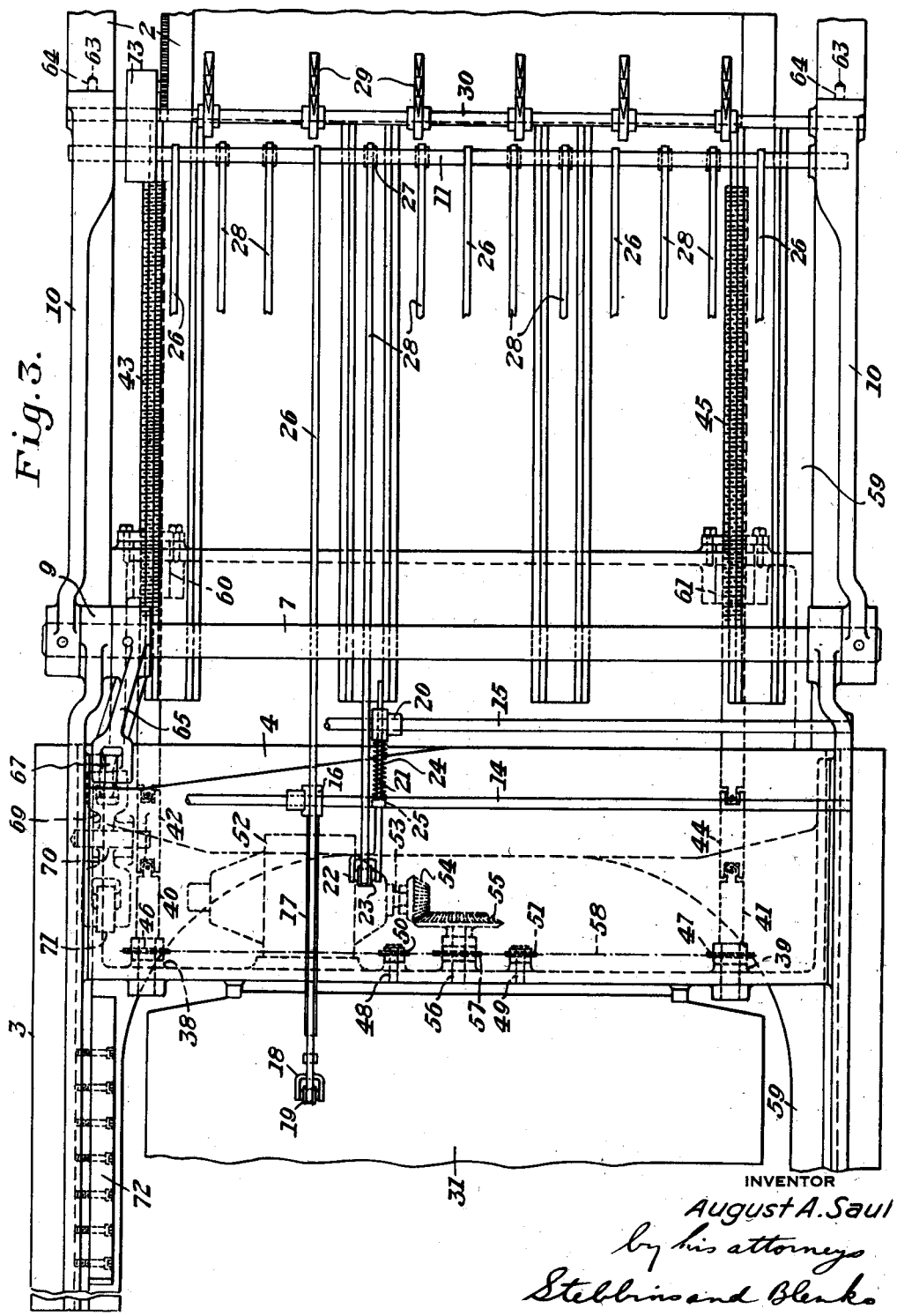
INVENTOR
August A. Saul
by his attorneys
Stebbins and Blenko

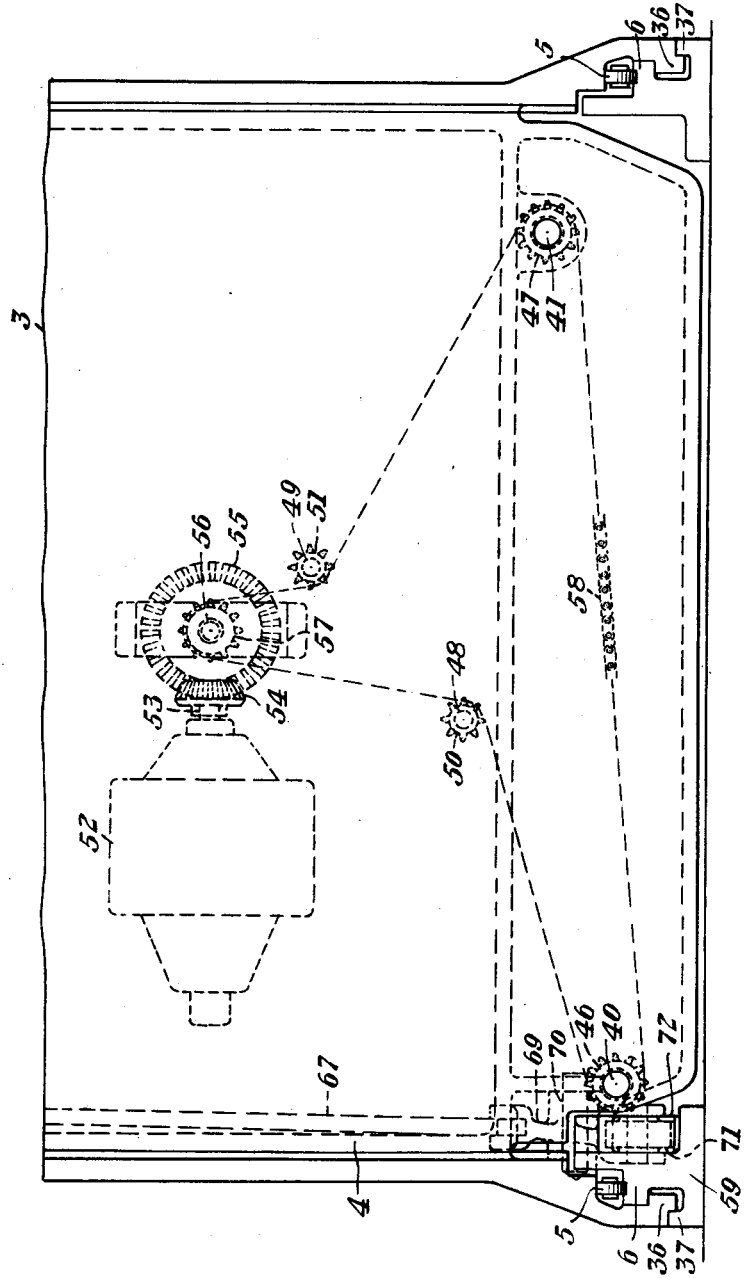

Patented Feb. 2, 1943

2,309,671

UNITED STATES PATENT OFFICE 2,309,671

MATERIAL HANDLING APPARATUS

August A. Saul, Pittsburgh, Pa., assignor to Miller Printing Machinery Co., Pittsburgh, Pa., a corporation of Pennsylvania Application August 23, 1940, Serial No. 353,871

32 Claims. (Cl. 271—45)

This invention relates to material handling apparatus. In certain of its more specific aspects it relates to apparatus for handling material in sheet form and the invention is especially adaptable for sheet handling apparatus for use in connection with a printing press or the like, such, for example, as a delivery or a feeder. For purposes of explanation and illustration the invention will be described as embodied in a delivery for a printing press.

It is known in the art of handling sheet-like material to employ a projecting conveyor which can be raised to inoperative position to get it out of the way to provide working space. Such conveyors have been movable to inoperative position by means performing that function only. The conveying mechanism has been undesirably complicated due to the movability of the conveyor to inoperative position and due to the provision of separate conveying means which cooperate to perform a conveying function when the parts are in operative position but which can be separated upon movement of the conveyor to inoperative position.

It is also known to provide material handling apparatus which is bodily movable into and out of operative position. In the printing art, for example, deliveries and feeders have been used which may be moved into and out of operative position relatively to the press with which they are employed. However, it has heretofore been necessary in the use of such apparatus so far as I am aware to perform a separate operation to move the conveying means to an inoperative out of the way position to provide working space adjacent the press.

I provide improved material handling apparatus obviating the disadvantages above mentioned and having other advantages. I provide material handling apparatus having conveying means which can be moved to an inoperative out of the way position but which completely does away with the complexities of similar conveying means heretofore employed. My material handling apparatus is preferably movable toward and from operative position and I provide means operable upon movement of such apparatus to move the conveying means toward and from its operative position. Thus when my invention is embodied, for example, in a delivery and the delivery is moved away from the press to inoperative position the conveying means extending from the delivery toward the press is automatically simultaneously raised to an inoperative out of the way position. Similarly, when the delivery is moved back to operative position relatively to the press the conveyor likewise automatically and simultaneously moves back to its operative position.

I find it preferably to first move the material handling apparatus through a predetermined distance before the conveying means begins to move, whereupon further movement of the material handling apparatus is accompanied by movement of the conveying means. For example, in a delivery I may provide cam means and a follower connected with the conveying means adapted to cooperate with the cam means to move the conveying means. The cam means and follower may be so designed and relatively positioned that the delivery will move a substantial distance, say several inches, away from the press before the follower engages the cam means to begin moving the conveying means.

Other details, objects and advantages of the invention will become apparent as the following description of a present preferred embodiment thereof proceeds.

In the accompanying drawings I have shown a present preferred embodiment of the invention, in which Figure 1 is an elevational view of delivery mechanism shown in operative position relatively to a printing press, portions of the delivery mechanism and press forming no part of the present invention being cut away;

Figure 3 is a plan view of the structure shown in Figure 1; and

Figure 4 is an end view of the delivery as viewed from the left-hand end of Figures 1, 2 and 3 and with portions omitted for clearness.

Figure 1:
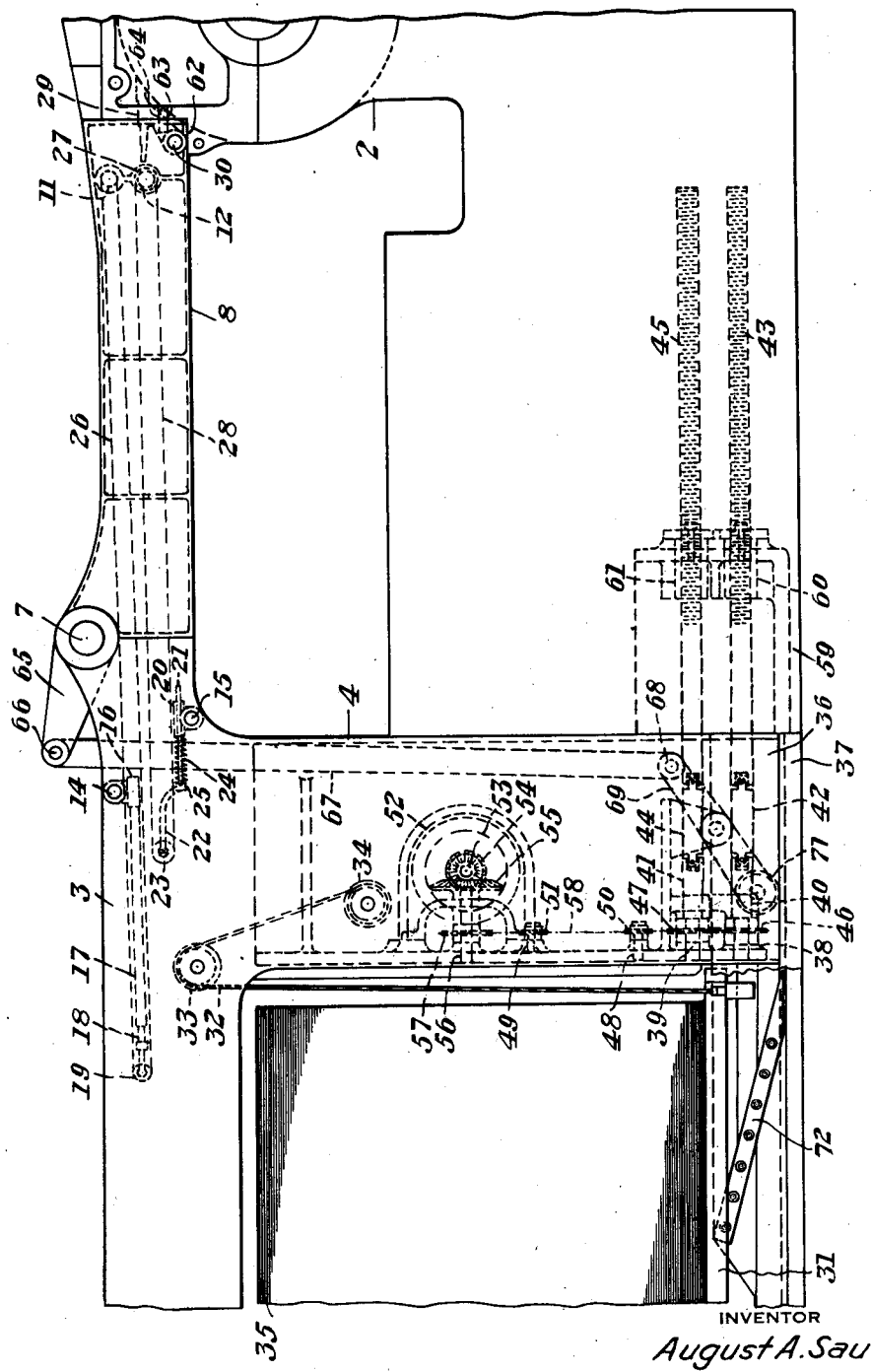

Referring now more particularly to the drawings, a printing press is indicated diagrammatically at 2 but is not shown in detail since the present invention does not relate to the press structure. Adapted to cooperate with the press to deliver therefrom printed sheets is a delivery designated generally by reference numeral 3. The delivery comprises a main or body portion 4 mounted upon rollers 5 riding upon stationary tracks 6 whereby the delivery may be bodily moved toward and from the press 2 and thus into and out of operative position relatively to the press. Pivoted to the body 4 by a cross shaft 7 is a frame 8 carrying one end of each of a plurality of endless conveyors, as will presently be described. The frame 8 is adapted to be swung about the pivot 7 from its generally horizontal operative position as shown in Figure 1 to its raised inoperative position as shown in solid lines in Figure 2. Means are provided, as will presently be described in detail, for raising the frame 8 automatically upon movement of the body 4 away from the press 2 and for lowering the frame 8 into operative position upon movement of the body 4 toward the press 2.

The shaft 7 is rotatably mounted in bearings 9 carried by the body 4. The frame 8 comprises a pair of side arms 10 each fixed to the shaft 7 as shown in Figure 3. Extending between the arms 10 near the right-hand ends thereof and rotatably mounted therein is an upper shaft 11 and a lower shaft 12. These shafts are adapted to be driven by any suitable means, as well known in the art. Driving mechanism therefor is contained in the housing 13 shown in Figure 3. Power for operating such mechanism may be derived from the press drive through suitable connections, as well known in the art.

Mounted in the body 4 is a pair of circular cross rods 14 and 15. Connected with the rod 14 at intervals therealong are brackets 16 each carrying an elongated support 17 extending generally horizontally away from the press. Each support 17 in turn carries a roller mounting 18 on which is rotatably mounted a roller 19. Connected with the rod 15 at intervals therealong are brackets 20 each carrying an elongated support 21 extending generally horizontally away from the press. Each support 21 in turn carries a roller mounting 22 on which is rotatably mounted a roller 23. Each support 21 is slidable within its bracket 20 and is urged toward the left viewing Figure 1 by a coil spring 24 bearing between the bracket and a head 25 on the support. Similarly, each roller mounting 18 is resiliently urged toward the left viewing Figure 1 by spring means concealed within the corresponding support 17 and bearing thereagainst and also bearing against the roller mounting. Consequently each of the rollers 19 and 23 is resiliently mounted for limited movement generally horizontally toward and away from the press and is normally urged away from the press or toward the left viewing Figure 1.

Disposed about each of the rollers 19 and also about the shaft 11 is an endless belt 26. Disposed about each of the rollers 23 and also about an enlargement or roller 27 fixed to the shaft 12 is an endless belt 28. When the shafts 11 and 12 are driven the endless belts 26 and 28 are likewise driven. Normally the shaft 11 is driven in the clockwise direction and the shaft 12 in the counter-clockwise direction viewing Figure 1. The rollers 27 are of somewhat greater diameter than the shaft 11 and the rollers 23 are of somewhat greater diameter than the rollers 19. The mechanism for driving the shafts 11 and 12 and the gearing between the shafts are such that the belts 26 and 28 move at a speed equal to the peripheral speed of the press cylinder. As is well known in the art, sheets pass from the press toward the left viewing Figure 1 between the belts 28 which lie below the sheets and the belts 26 which lie above them. The sheets normally rest upon the belts 28 and are conveyed away from the press toward the left viewing Figure 1 thereby, the belts 26 serving to insure that the sheets do not fly up during movement. The sheets are stripped from the press cylinder by strippers 29 fixed to a stripper shaft 30 operated in well known manner.

The delivery 3 comprises a pile support 31 only a portion of which is shown in the drawings since the pile support and its operating mechanism may be of well known construction. Such support is carried by cables 32 passing over pulleys 33 and adapted to be wound up upon drums 34. The mechanism for turning the drums 34 may be of well known construction and is not here shown in detail.

A pile of sheets is illustrated at 35 disposed upon the pile support 31. These are printed sheets which have been delivered from the press by the delivery mechanism. Each sheet which passes from the press between the lower belts or tapes 28 and the belts or tapes 26 ultimately comes to rest upon the top of the pile of sheets 35. As each sheet leaves the left-hand end of the belts 28 it may be desired be assisted in reaching its position upon the pile 35 by other conveying mechanism forming part of the delivery, but since such other conveying mechanism, if employed, forms no part of the present invention it is not shown. Sheets may pass directly from the belts 28 to the pile and may be centered thereon by the usual joggers (not shown).

As above mentioned, the delivery is movable toward and from the press upon tracks 6 which are stationary relatively to the press. The delivery and tracks have interfitting portions 36 and 37, respectively, as shown in Figure 4, to insure proper positioning of the delivery at all times and prevent tilting thereof. The delivery body 4 has bearings 38 and 39, respectively, wherein are rotatably journaled shafts 40 and 41, respectively. The shaft 40 is connected through a universal joint 42 with a screw 43 extending toward the press and the shaft 41 is connected through a universal joint 44 with a screw 45 extending toward the press. Fixed to the shafts 40 and 41 are sprockets 46 and 47, respectively. Journaled in the delivery body 4 are stub shafts 48 and 49 carrying idler sprockets 50 and 51, respectively. Mounted on the body 4 is an electric motor 52 whose shaft 53 carried a bevel pinion 54. The bevel pinion 54 meshes with a bevel gear 55 fixed to a driving shaft 56 journaled for rotation in the body and to which is also fixed a driving sprocket 57. A sprocket chain 58 meshes with the sprockets 57, 50, 46, 47 and 51 as shown in Figure 4. The mountings for the idler sprockets 50 and 51 may be such that these sprockets or one thereof may be shifted to suitably adjust the tension of the sprocket chain 58.

The press 2 comprises a base 59 having fixedly mounted therein nuts 60 and 61 with which the screws 43 and 45 are, respectively, in threaded engagement. The screws 43 and 45 are of the same size, hand and pitch and the sprockets 46 and 47 are of the same size, so when the motor 52 is operated both of the screws 43 and 45 will turn in the same direction at the same speed and will cooperate in exactly similar manner with the respective nuts 60 and 61 through which they pass. Since the nuts 60 and 61 are fixedly positioned in the press base, driving of the screws by the motor 52 will inevitably result in movement of the delivery toward or from the press depending upon the direction in which the motor armature turns. Preferably the motor is a reversing motor so that it may be driven in either direction. Consequently when it is desired to move the delivery toward the press the motor is driven in one direction and when it is desired to move the delivery away from the press the motor is driven in the opposite direction.

The limits of movement of the delivery toward and from the press may be determined in any desired manner, as, for example, by limit switches in the motor circuit. Means may, if desired, be provided for fastening the delivery to the press when in operative position. When the delivery is in operative position relatively to the press the end of the frame 8 is positioned by a portion 62 of the press and positioning pins 63 projecting longitudinally from the frame enter positioning holes or sockets 64 in the press.

As above explained, the frame 8 is pivoted to the delivery body by the shaft 7, the frame being fixed to the shaft 7 which is free to turn in its bearings 9 in the body. Also fixed to the shaft 7 and extending toward the left therefrom viewing Figure 1 is an arm 65. Pivoted to the arm 65 and 66 is a link 67 which extends generally downwardly and the lower end of the link 67 is pivotally connected at 68 to a lever 69 having a fulcrum 70 in the body 4 and the opposite end of which carries a cam following roller 71. The base 59 of the press carries an inclined cam 72 the upper active surface of which extends upwardly and toward the left viewing Figure 1.

In Figure 1 the delivery is shown in operative position. When it is desired to move the delivery to inoperative position away from the press the motor 52 is energized to turn the screws 43 and 45 in a direction which will result in movement of the delivery body 4 toward the left viewing Figure 1. The entire delivery including the body 4 and the frame 8 will move rectilinearly toward the left for a substantial distance while the frame remains in fixed position relatively to the body. Such movement will continue until the frame 8 reaches the chain line position of Figure 2. At such time it is completely out of engagement with and spaced from the press. When the delivery has reached the position indicated by the chain line showing of the frame 8 in Figure 2 the follower 71 has just reached the lower end of the cam 72. Further movement of the delivery toward the left is accompanied by riding of the follower 71 up the inclined cam 72 and consequent turning of the lever 69 about its fulcrum 70 in the clockwise direction viewing Figure 2. This results in pulling the link 67 downwardly and the link in turn through the arm 65 causes the frame 8 to pivot in the counter-clockwise direction about the axis of the shaft 7. Thus as the delivery moves toward the left the frame 8 is automatically pivotally raised from the position shown in chain lines in Figure 2 to the position shown in solid lines in Figure 2. When the frame is in the position shown in solid lines in Figure 2 the follower 71 has reached the top of the cam 72. Preferably the motor 52 will be stopped by a limit switch when the parts are in the position corresponding to the solid line position of the frame 8 in Figure 2, although the parts may be suitably designed to raise the frame higher if desired.

Figure 2:
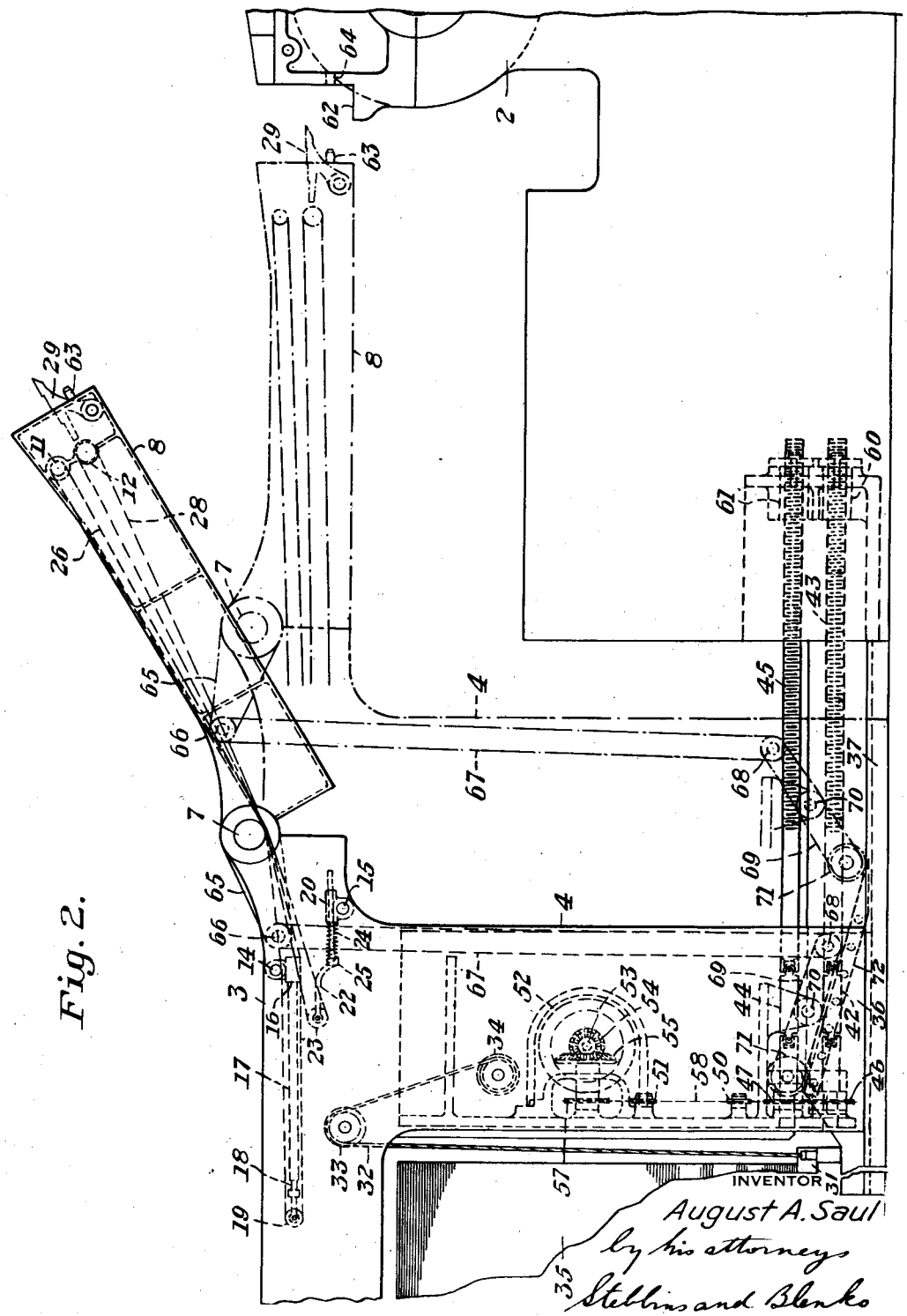
Figure 2 is a view similar to Figure 1 showing the delivery mechanism in inoperative position in solid lines and in an intermediate position in chain lines.

When the motor is operated in the opposite direction the delivery is moved toward the right, which movement is accompanied by riding of the follower 71 down the inclined cam 72 and consequent swinging of the frame 8 generally in the clockwise direction about the axis of the shaft 7 from the solid line position of Figure 2 to the chain line position of Figure 2. Continued movement of the delivery toward the press is unaccompanied by any relative movement between the body 4 and the frame 8 and the entire delivery moves rectilinearly into operative position relatively to the press.

When the frame 8 is swung up to the position shown in solid lines in Figure 2 the tapes 26 and 28 are displaced to some extent around the shaft 7, as shown. The resilient mountings for the rollers 19 and 23 come into play at this point, allowing such rollers due to the added tension on the tapes to move resiliently toward the right. When the frame 8 again assumes its normal or horizontal position the tapes assume their normal position as shown in Figure 1 and the rollers 19 and 23 move back toward the left to their normal positions under the action of the springs in their mountings.

Thus I do away with the necessity of the provision of complicated conveyor mechanism which has heretofore been provided when a portion thereof has been mounted for movement to and from operative position. My conveyor mechanism is extremely simple and low in cost, yet it is highly effective in use. A single belt system extends from the outermost point of the delivery to a position over the pile of sheets therein. Likewise the necessity for performing a separate operation to move the projecting or overhanging portion of the delivery to inoperative position is obviated as this is done automatically upon movement of the delivery body to inoperative position. The differential movement of the body 4 and frame 8 is particularly advantageous in that it insures proper movement of the frame into and out of operative position relatively to the press by rectilinear movement while also swinging the same up out of the way to provide working space adjacent the press. The means for moving the delivery relatively to the press is simple and effective and cooperates effectively with the means for raising and lowering the conveyor frame.

While I have shown and described a present preferred embodiment of the invention it is to be distinctly understood that the invention is not limited thereto but may be otherwise variously embodied within the scope of the following claims.

I claim:

1. Material handling apparatus comprising a body, a material handling portion pivoted thereto, the body being movable, and means for pivotally moving the material handling portion about its pivotal connection with the body upon movement of the body.

2. Material handling apparatus comprising a movable body, a material handling portion adapted to assume operative position relatively to the body when the body is in a predetermined position and to assume an inoperative out of the way position when the body is in another predetermined position and connections for moving the material handling portion between operative and inoperative positions upon movement of the body between said predetermined positions.

3. Material handling apparatus comprising a body movable to and from a position relatively to another material handling member to enable said apparatus and said member cooperatively to handle material, said apparatus having a material handling portion, and means for moving said material handling portion relatively to said body into position to participate in the cooperative handling of material by said apparatus and said member upon movement of said body to said first mentioned position.

4. Material handling apparatus comprising a body movable to and from a position relatively to another material handling member to enable said apparatus and said member cooperatively to handle material, said apparatus having a material handling portion adapted to participate in the cooperative handling of material by said apparatus and said member when said body is in said first mentioned position, and means for moving said material handling portion relatively to said body to inoperative position relatively thereto upon movement of said body out of said first mentioned position.

5. A material handling apparatus comprising a body, a material handling portion pivoted to the body and conveying means connected adjacent one end with the body and adjacent the other end with said portion, the conveying means being adapted to be deformed about the pivotal connection between the body and said portion when said portion is moved pivotally relatively to the body.

6. Apparatus for handling generally flat or sheet-like material comprising a body, a material handling portion movably connected with the body and opposed endless conveyors between which the flat or sheet-like material is adapted to pass each connected adjacent one end with the body and adjacent the other end with said portion.

7. Material handling apparatus comprising a body, a material handling portion movably connected with the body and movable relatively thereto between operative and inoperative positions, an endless conveyor stretched between mounting means on the body and mounting means on said portion and spring means engaging at least one of said mounting means so as to allow limited resilient movement thereof.

8. Material handling apparatus comprising a body, a material handling portion movably connected with the body and movable relatively thereto between operative and inoperative positions and an endless conveyor stretched between mounting means on the body and mounting means on said portion, at least one of said mounting means being resiliently mounted to provide for lengthening and shortening of the conveyor upon movement of said portion between operative and inoperative positions.

9. Material handling apparatus comprising a body, a material handling portion pivoted to the body and pivotally movable relatively thereto between operative and inoperative positions and an endless conveyor stretched between mounting means on the body and mounting means on said portion, at least one of said mounting means being itself resiliently mounted.

10. Material handling apparatus comprising a base, a body movable relatively thereto, a material handling portion movably connected with the body and connections between said portion and the base for moving said portion relatively to the body upon movement of the body relatively to the base.

11. Material handling apparatus comprising a base, a body movable relatively thereto, a material handling portion movably connected with the body, conveying means connected adjacent one end with the body and adjacent the other end with said portion and connections between said portion and the base for moving said portion relatively to the body upon movement of the body relatively to the base.

12. Material handling apparatus comprising a base, a body movable relatively thereto, a material handling portion movably connected with the body and connections including a cam and follower between said portion and the base for moving said portion relatively to the body upon movement of the body relatively to the base.

13. Material handling apparatus comprising a base, a body movable relatively thereto, a material handling portion movably connected with the body and connections including an inclined plane and a lever operated thereby between said portion and the base for moving said portion relatively to the body upon movement of the body relatively to the base.

14. Material handling apparatus comprising a base, a body, screw means for moving the body relatively to the base, a material handling portion movably connected with the body and connections between said portion and the base for moving said portion relatively to the body upon movement of the body relatively to the base.

15. Material handling apparatus comprising a base, a body movable relatively thereto, a material handling portion pivoted to the body and connections between said portion and the base for pivotally moving said portion reatively to the body upon movement of the body relatively to the base.

16. Sheet handling apparatus for handling sheets cooperatively with a printing press or the like comprising a body movable toward and from the press or the like, a sheet handling portion movably connected with the body and means for moving said portion to predetermined position relatively to the body upon movement of the body toward or from the press or the like.

17. Sheet delivery apparatus for a printing press or the like comprising a body movable toward and from the press or the like, sheet handling means movably connected with the body and adapted to assume operative and inoperative positions and means for moving the sheet handling means to operative position upon movement of the body toward the press or the like and for moving the sheet handling means to inoperative position upon movement of the body from the press or the like.

18. Sheet handling apparatus for handling sheets cooperatively with a printing press or the like comprising a body movable into and out of operative position relatively to the press or the like, sheet handling means movably connected with the body and means for moving the sheet handling means into operative position relative to the body and the press or the like upon movement of the body into operative position relatively to the press or the like.

19. Sheet handling apparatus for handling sheets cooperatively with a printing press or the like comprising a body movable into and out of operative position relatively to the press or the like, sheet handling means movably connected with the body and means for moving the sheet handling means to an out of the way inoperative position to provide working space adjacent thereto upon movement of the body out of operative position relatively to the press or the like.

20. Sheet handling apparatus for handling sheets cooperatively with a printing press or the like comprising a body movable into and out of operative position relatively to the press or the like, sheet handling means swingably connected with the body and adapted when in operative position to extend from the body toward the press or the like and means for swinging the sheet handling means generally upwardly to inoperative position upon movement of the body out of operative position relatively to the press or the like.

21. Sheet handling apparatus for handling sheets cooperatively with a printing press or the like comprising a body movable into and out of operative position relatively to the press or the like, sheet handling means swingably connected with the body and adapted when in operative position to extend from the body toward the press or the like, said sheet handling means comprising one end of a sheet conveyor the other end of which is carried directly by the body, and means for swinging the sheet handling means generally upwardly to inoperative position upon movement of the body out of operative position relatively to the press or the like.

22. Material handling apparatus comprising a movable body, a material handling portion pivoted to and overhanging the body, a link pivoted to the material handling portion at a point opposite the overhanging part thereof from its pivotal connection with the body and means connected with the link for tilting the material handling portion to raise the overhanging part thereof upon movement of the body.

23. Material handling apparatus comprising a movable body, a material handling portion pivoted to and overhanging the body, a link pivoted to the material handling portion at a point opposite the overhanging part thereof from its pivotal connection with the body, a lever pivotally connected with the link, a cam follower connected with the lever and a cam cooperating with the cam follower for swinging the lever to tilt the material handling portion and raise the overhanging part thereof upon movement of the body.

24. Material handling apparatus comprising a movable body, a frame pivoted thereto, an endless conveyor having one end mounted on the frame and the other end mounted on the body and means for tilting the frame about its pivotal connection with the body upon movement of the body.

25. Material handling apparatus comprising a movable body, a frame pivoted thereto, an endless conveyor having one end mounted on the frame and the other end mounted on the body, screw means for moving the body, means for turning the screw means to cause movement of the body and means for tilting the frame about its pivotal connection with the body upon turning of the screw means and consequent movement of the body.

26. Material handling apparatus comprising a base, a body movable relatively thereto, a material handling portion movably connected with the body and means effective upon movement of the body relatively to the base, but only after a predetermined initial movement of the body during which the material handling portion remains in fixed position relatively to the body, to move the material handling portion relatively to the body.

27. Material handling apparatus comprising a movable body, a material handling portion movably connected with the body, connections with the material handling portion for moving the same relatively to the body and means engaging said connections upon movement of the body after a predetermined initial movement thereof to cause movement of the material handling portion relatively to the body.

28. Material handling apparatus comprising a movable body, a material handling portion movably connected with the body, connections with the material handling portion for moving the same relatively to the body and an inclined cam engaging said connections upon movement of the body after a predetermined initial movement thereof to cause movement of the material handling portion relatively to the body.

29. Material handling apparatus comprising a body mounted for movement between predetermined limits, a material handling portion movably connected with the body and means moving the material handling portion relatively to the body upon movement of the body between said limits, said means being so constructed and arranged that the material handling portion assumes a predetermined position for each position of the body between said limits.

30. Material handling apparatus comprising a body mounted for movement between predetermined limits, a material handling portion connected with the body and movable relatively thereto to assume operative and inoperative positions and means for moving the material handling portion relatively to the body upon movement of the body between said limits, said means being so constructed and arranged that when the body is at one limit of its movement the material handling portion is in operative position and when the body is at the other limit of its movement the material handling portion is in inoperative position.

31. Material handling apparatus comprising material handling mechanism, the material handling apparatus being assembleable with and separatable from cooperating mechanism, and means for moving the material handling mechanism to inoperative position upon separation of the material handling apparatus and the cooperting mechanism.

32. Material handling apparatus comprising a body, a material handling portion movably connected with the body, an endless conveyor having when in operative position only two generally parallel reaches connected adjacent one end with the body and adjacent the other end with said portion and so that movement of said portion relatively to the body tends to change materially the length of said conveyor and mounting means for the conveyor resiliently carried by one of the body and said portion to provide for lengthening and shortening of the conveyor upon movement of said portion relatively to the body.

AUGUST A. SAUL.

CERTIFICATE OF CORRECTION.

Patent No. 2,309,671. February 2, 1943.

AUGUST A. SAUL.

It is hereby certified that error appears in the printed specification of the above numbered patent requiring correction as follows: Page 1, second column, line 4, for "preferably" read --preferable--; page 2, second column, line 18, for "be" first occurrence, read --if--; page 3, first column, line 20, for "and" read --at--; page 4, second column, line 29, for "reatively" read --relatively--; and that the said Letters Patent should be read with this correction therein that the same may conform to the record of the case in the Patent Office.

Signed and sealed this 2nd day of March, A. D. 1943.

(Seal)

Henry Van Arsdale,
Acting Commissioner of Patents.